US008040631B2

(12) United States Patent
Hampshire

(10) Patent No.: US 8,040,631 B2
(45) Date of Patent: Oct. 18, 2011

(54) SERVO PROCESSORS THAT ALTERNATELY CONTROL HEAD POSITIONING RELATIVE TO SEQUENTIAL SERVO PATTERNS

(75) Inventor: Randall David Hampshire, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/467,742

(22) Filed: May 18, 2009

(65) Prior Publication Data

US 2010/0290153 A1    Nov. 18, 2010

(51) Int. Cl.
G11B 5/596    (2006.01)
G11B 21/02    (2006.01)
G11B 15/12    (2006.01)

(52) U.S. Cl. ............................. 360/77.08; 360/75; 360/61

(58) Field of Classification Search ......................... None
See application file for complete search history.

(56) References Cited

U.S. PATENT DOCUMENTS

| 3,593,333 | A  | * | 7/1971  | Oswald ..................... 360/77.08 |
| 5,444,684 | A  |   | 8/1995  | Yanagi et al. |
| 5,576,910 | A  | * | 11/1996 | Romano et al. ............ 360/77.08 |
| 6,067,206 | A  |   | 5/2000  | Hull et al. |
| 6,204,990 | B1 | * | 3/2001  | Bruccoleri et al. ........ 360/77.11 |
| 7,080,188 | B2 |   | 7/2006  | Byers et al. |
| 7,196,864 | B1 | * | 3/2007  | Yi et al. ..................... 360/77.04 |
| 7,219,182 | B2 |   | 5/2007  | Byers et al. |
| 2004/0088459 | A1 | | 5/2004  | Gary et al. |
| 2004/0177200 | A1 | | 9/2004  | Chu |
| 2008/0174903 | A1 | * | 7/2008 | Kosugi ........................... 360/75 |

\* cited by examiner

*Primary Examiner* — Andrew L Sniezek
(74) *Attorney, Agent, or Firm* — Deirdre Megley Kvale; Westman, Champlin & Kelly, P.A.

(57) ABSTRACT

The operational bandwidth of a servo control circuit can be increased using a plurality of servo processors that handoff between them the responsibility for controlling head positioning in response to sequentially occurring servo patterns.

20 Claims, 6 Drawing Sheets

SERVO PROCESSORS THAT ALTERNATELY CONTROL HEAD POSITIONING RELATIVE TO SEQUENTIAL SERVO PATTERNS

BACKGROUND

The present invention generally relates to controlling head movement and, more particularly, to controlling head movement relative to a sequence of servo patterns on a media.

A typical data storage disk drive includes a plurality of magnetic recording disks which are mounted to a rotatable hub of a spindle motor and rotated at a high speed. An array of read/write heads is disposed adjacent to surfaces of the disks to transfer data between the disks and a host device. The heads can be radially positioned over the disks by a rotary actuator and a closed loop servo system.

The servo system can operate in two primary modes: seeking and track following. During a seek, a selected head is moved from an initial track to a target track on the corresponding disk surface. Upon reaching the target track, the servo system enters the track following mode wherein the head is maintained over the center of the target track while data is written/read. During track following, prerecorded servo data sensed by the head is demodulated to generate a position error signal (PES), which provides an indication of the position error of the head away from the track center. The PES is then converted into an actuator control signal, which is fed back to an actuator to position the head.

Typically, a microprocessor executes both the servo code that controls servo functionality and data control code that controls the communication interface between the disk drive and a host, cache management, defect table management, and other disk drive management functions. The servo code must operate at a higher priority than the data control code to ensure that the servo control loop efficiently and accurately carries out head positioning during seek and track following operations. It is becoming increasingly more difficult to ensure that in such a configuration that the servo code can be executed at a sufficiently high operational bandwidth as the computational complexity of the servo code increases and as additional functionality is added to the data control code.

SUMMARY

The operational bandwidth of a servo control circuit can be increased using a plurality of servo processors that handoff between them the responsibility for controlling head positioning responsive to sequentially occurring servo patterns.

In some embodiments, a circuit includes a plurality of servo processors that control positioning of a head by an actuator in response to different defined ones of sequentially occurring servo signals from a plurality of spaced apart servo patterns on a media that is moving relative to the head.

In some other embodiments, a plurality of servo processors are sequentially operated to control positioning of a head by an actuator in response to different defined ones of sequentially occurring servo signals from a plurality of spaced apart servo patterns on a media that is moving relative to the head.

In yet some other embodiments, a servo circuit includes a memory circuit and a plurality of servo processors. An actuator moves a head across a data storage disk. The plurality of servo processors take turns controlling the actuator to position the head in response to different defined ones of sequentially occurring servo signals from a plurality of spaced apart servo patterns on the disk. The memory circuit is configured as a shared memory that is accessed by each of the servo processors to share information therebetween via defined shared memory locations in the memory circuit.

DETAILED DESCRIPTION

Figure 1:
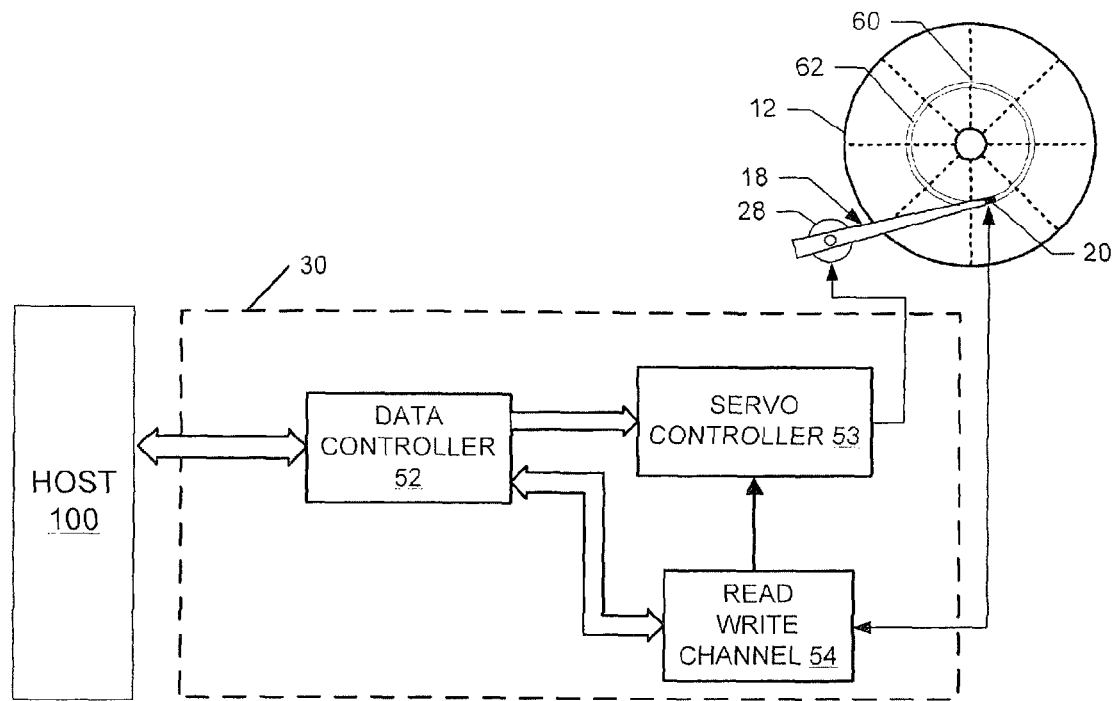
FIG. 1 is a block diagram of disk drive electronic circuits that include a servo controller having a plurality of servo processors that are configured in accordance with some embodiments.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register.

Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop having processors that take turns controlling head positioning by an actuator in response to different defined ones of sequentially occurring spaced apart servo patterns on a media that is moving relative to the head.

Some embodiments may arise from the present realization that as the requirements for data storage densities continue to rapidly increase and disk drives are expected to operate in harsher environments, a disk drive servo control central processing unit (CPU) circuit, also referred to herein as "microprocessor" and "processor", will be required to perform an increasing number of tasks and with greater response bandwidth that may soon exceed the available computational throughput. Although servo processor clock speeds may be able to be increased to increase throughput, such increases typically consume substantially more power and/or substantially increase the cost of the processor.

In accordance with some embodiments, a plurality of servo processors that process servo information in parallel are used to control the positioning of a head by an actuator. More particularly, as will be described in further detail below, two or more servo processors control head positioning in response to different defined ones of sequentially occurring servo signals from a plurality of spaced apart servo patterns on a media that is moving relative to the head.

FIG. 1 is a block diagram of disk drive electronic circuits 30 which include a data controller 52, a servo controller 53, and a read write channel 54. Although two separate controllers 52 and 53 and a read write channel 54 have been shown for purposes of illustration and discussion, it is to be understood that their functionality described herein may be integrated within a common integrated circuit package or distributed among more than one integrated circuit package. A head disk assembly can include a plurality of data storage disks 12, an actuator arm 18 with a plurality of read/write heads 20 which are moved radially across different data storage surfaces of the disk(s) 12 by an actuator motor (e.g., voice coil motor) 28, and a spindle motor which rotates the disk(s) 12.

Write commands and associated data from a host device 100 are buffered by the data controller 52. The host device 100 can include, but is not limited to, a desktop computer, a laptop computer, a personal digital assistant (PDA), a digital video recorder/player, a digital music recorder/player, and/or another electronic device that can be communicatively coupled to store and retrieve data in the head disk assembly. The data controller 52 carries out buffered write commands by formatting the associated data into blocks with the appropriate header information, and transfers the formatted data via the read/write channel 54 to logical block addresses (LBAs) on a data storage surface of the disk 12 identified by the associated write command.

The read write channel 54 can convert data between the digital signals processed by the data controller 52 and the analog signals conducted through the heads 20. The read write channel 54 provides servo data read from servo sectors 60 on the disk 12 to the servo controller 53. The servo sectors 60 may be configured in a conventional manner that is well known in the art. The servo data can be used to detect the location of a head 20 relative to LBAs on the disk 12. The servo controller 53 can use LBAs from the data controller 52 and the servo data to seek a head 20 to an addressed track 62 and block on the disk 12 (i.e., seek mode), and to maintain the head 20 aligned with the track 62 while data is written/read on the disk 12 (i.e., track following mode).

Figure 2:
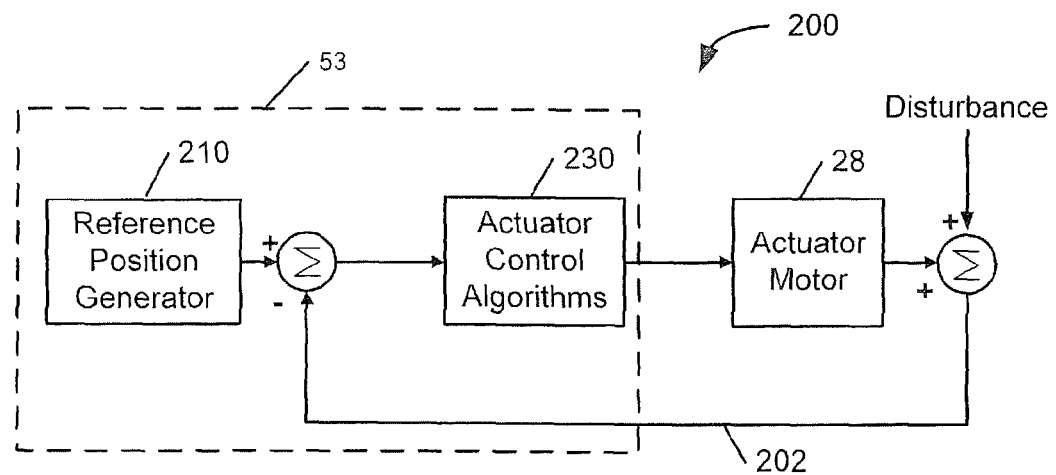
FIG. 2 is a further block diagram of a servo control loop within the servo controller of FIG. 1 in accordance with some embodiments.

FIG. 2 is a further block diagram of a servo control loop 200 that includes the servo controller 53 of FIG. 1 in accordance with some embodiments. During track following and track seeking operations, the position of a head 20 relative to the servo patterns in the servo sectors 60 is determined from the servo signal 202 read by the head 20 from the servo patterns. The position of the head 20 is affected by the combined contributions of movement by the actuator motor 28 and disturbances forces on the actuator arm 18 and/or head 20, such as from external shock, disk flutter, and/or windage effects on the actuator arm 18 and/or the head 20. Accordingly, the servo signal 202 includes a disturbance component therein.

The servo signal 202 is fed-back to the servo controller 53 where it is combined with a reference position signal from a reference position generator 210 to generate a position error signal (PES). The reference position signal from the reference position generator 210 indicates a desired radial position of the head 20, and may be a DC value (e.g., static value) for at least a portion of the revolution of the disk. The reference position generator 210 can be configured to drive the head 20 toward the centerline of the track during track following, or to move the head off-track during seeking. Actuator control algorithms 230 are configured to respond to the PES by generating an actuator control signal that is converted to an analog signal provided to the actuator motor 28 to control radial movement of the head(s) across the disk(s).

In accordance with some embodiments, the servo controller 53 includes a plurality of separate servo processors that control positioning of a head 20 by the actuator motor 28, such as during seek operations and/or track following operations, in response to different defined ones of sequentially occurring servo signals from a plurality of spaced apart servo patterns different ones of the servo sectors 60 as the disk 12 rotates relative to the head 20. The servo processors may reside in separate integrated circuit packages or may reside on a common semiconductor substrate within a common integrated circuit package (e.g., a multichip package). As will be explained in further detail below, the servo processors are configured to sequentially handoff responsibility for controlling head movement in a defined order through the servo processors in response to the head 20 reading different ones of the spaced apart servo patterns.

Figure 3:
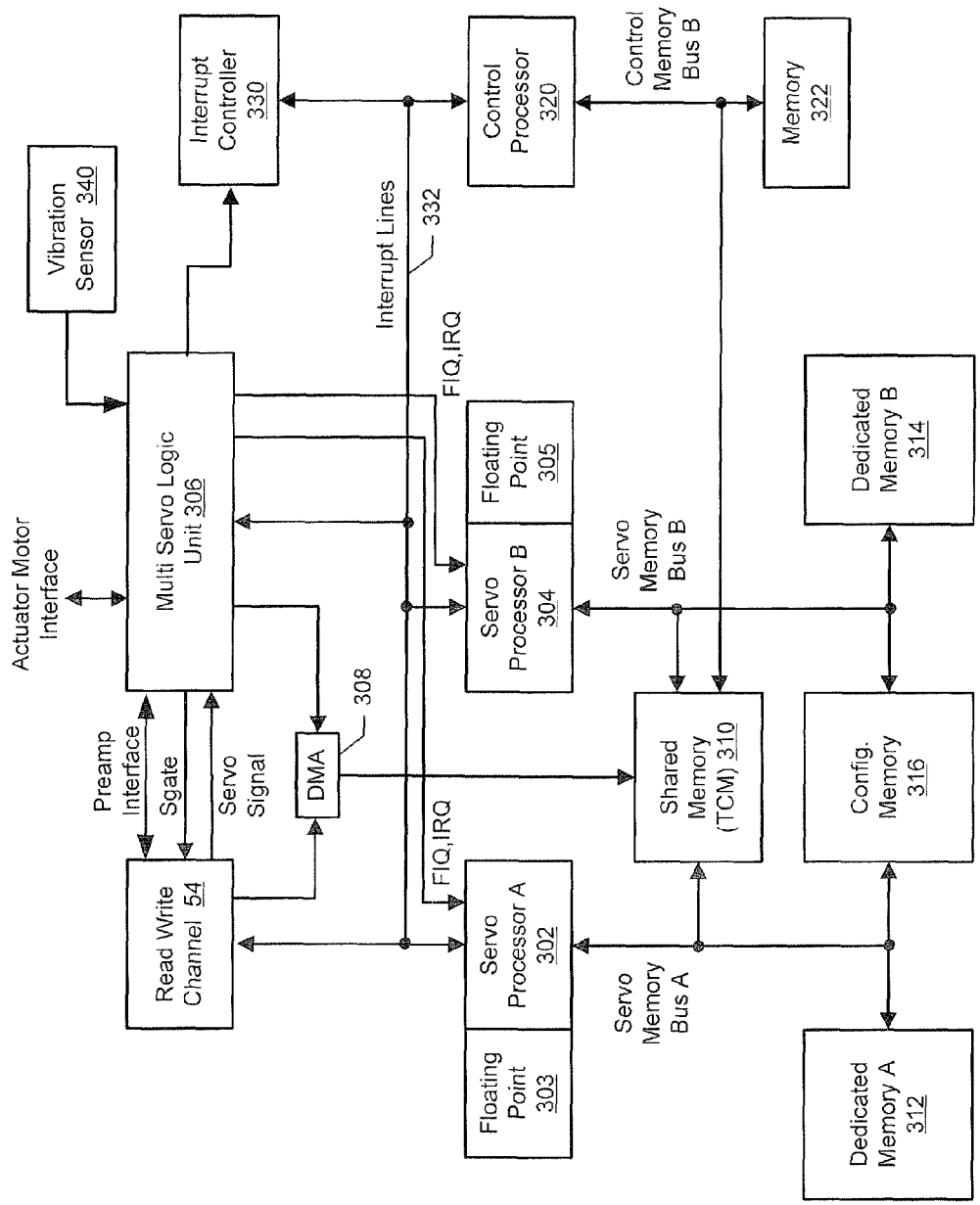
FIG. 3 is a block diagram of the servo controller of FIG. 1 that includes two servo processors, a shared memory, and other circuitry in accordance with some embodiments.

FIG. 3 is a block diagram of exemplary embodiments of the servo controller 53 that includes two servo processors, Servo Processor A 302 and Servo Processor B 304. Although the exemplary servo controller 53 includes only two servo processors, it is to be understood that it may include any plural number of processors that are configured to control movement of a head in accordance with various embodiments of the present invention. When the servo controller 53 includes more than two servo processors, the servo processors may sequentially handoff responsibility for controlling head movement in a circular order, or another defined order (e.g., first available takes control), through the servo processors in response to the head 20 reading different ones of the spaced apart servo patterns.

A multi-servo logic unit 306 interfaces the servo controller 53 to the actuator motor 28 and to the read write channel 54. The multi-servo logic unit 306 generates a Sgate signal that is timed to inhibit writing while the head is positioned over the servo sectors 60, and receives the servo signal from the read write channel 54 as the head 20 reads servo patterns from the servo sectors 60. The multi-servo logic unit 306 controls the actuator motor 28 through the actuator motor interface to control positioning of the head 20 during, for example, seek operations and track following operations.

Servo Processor A 302 and Servo Processor B 304 are each configured to control positioning of the head 20 by the actuator motor 28 in response to the servo signal. As shown in FIG. 3, one or both of the servo processors (Servo Processor A 302 and Servo Processor B 304) can include a floating-point processing unit FPU (303 and 305) to increase their floating-point processing throughput, although in some other embodiments the servo processors may operate without using a FPU. Data from the servo signal may be written from the read write channel 54 and/or the multi-servo logic unit 306 into a shared memory (tightly coupled memory TCM) 310 by a direct memory access circuit 308. The shared memory 310 can be configured to allow simultaneous access to memory locations therein by Servo Processor A 302 and Servo Processor B 304. Servo Processor A 302 and Servo Processor B 304 can share common servo control operational code that is located within the shared memory 310 and can further access other operational code that is unique to the respective processors in separate dedicated memories.

As will be described below, because Servo Processor A 302 and Servo Processor B 304 take turns controlling head positioning using the same types of operational input data and output data, they may execute substantially identical servo control operation code from the shared memory 110, which may result in a corresponding substantial decrease in the complexity and amount of work required to implement servo control operational code that was designed for processing by a single processor to instead being processed by two or more processors in accordance with various embodiments of the present invention. Accordingly, a plurality of servo processors that are configured to operate in accordance with at least some embodiments herein may be able to execute operational code from a code database substantially independent of whether that code was designed for use on a single processor.

For example, Servo Processor A 302 may access unique operational code and data within dedicated memory A 312, and Servo Processor B 304 may access unique operational code and data within dedicated memory B 314 via respective servo memory buses A and B. Exemplary unique operation code functionality that may be executed by Servo Processor A 302 and/or Servo Processor B 304 can include, but is not limited to, spin-up and/or speed control of the spin motor, controlling the actuator motor 28 to park the head 20 during disk spin-down, interfacing with the data controller 52 to receive seek commands, and/or carrying-out calibration operations for actuator movement, disk surface testing, head sensitivity, etc. The servo controller 53 may further include a configurable memory that can be sequentially accessed by both Servo Processor A 302 and Servo Processor B 304 via the servo memory buses A and B. The servo controller 53 may include another control processor 320 that accesses data and operational code in a dedicated memory 322 via a control memory bus B, and which may carryout some or all of the exemplary unique operation code functionality that was described above as being possibly carried out by Servo Processor A 302 and/or Servo Processor B 304.

As the head 20 encounters different ones of the sequentially occurring servo sectors 60, an interrupt controller 330 generates alternating interrupts that alternately interrupt Servo Processor A 302 or Servo Processor B 304, via interrupt lines 332, that trigger the interrupted one of the servo processors (Servo Processor A 302 or Servo Processor B 304) to read and respond to the servo data in the shared memory 310, which has been written therein for a present servo sector 60, to control positioning of the head 20. Alternatively or additionally, the servo processors (Servo Processor A 302 or Servo Processor B 304) may handoff responsibility for controlling positioning of the head 20 from one to the other in response to respective interrupts that are received directly from the multi-servo logic unit 306, such as via the illustrated fast interrupt request (FIQ) interrupt request (IRQ) lines.

Accordingly, as the head 20 encounters odd and even servo sectors 60 that alternately occur around the disk 12, Servo Processor A 302 and Servo Processor B 304 can be alternately triggered, via interrupts, to either relinquish or take over control of head positioning during a track following operation and/or during a seek operation.

For example, Servo Processor A 302 can be configured to respond to interrupts generated when the head 20 encounters even servo sectors 60 and Servo Processor B 304 can be configured to respond to interrupts generated when the head 20 encounters odd servo sectors. While Servo Processor A 302 is actively controlling head positioning in response to data that is presently being read from an even servo burst, the other Servo Processor B 304 can be operating in the background to carry out further actuator control algorithmic operations on data that was read from the last occurring odd servo burst. Similarly, while Servo Processor B 304 is actively controlling head positioning in response to data that is presently being read from an odd servo burst, the other Servo Processor A 302 can be operating in the background to carry out further actuator control algorithmic operations on data that was read from the last occurring even servo burst. In this manner, responsibility for controlling head positioning can "ping-pong" back and forth between Servo Processor A 302 and Servo Processor B 304.

As will be explained below with regard to FIG. 4, Servo Processor A 302 and Servo Processor B 304 share servo data between them to provide coefficients, states, etc. that are generated by actuator control algorithms in one of the processors from a previously read servo sector for use by the actuator control algorithms in the other processor when processing another servo sector that is being presently read, and vice-versa as Servo Processor A 302 and Servo Processor B 304 take turns controlling head positioning.

Figure 4:
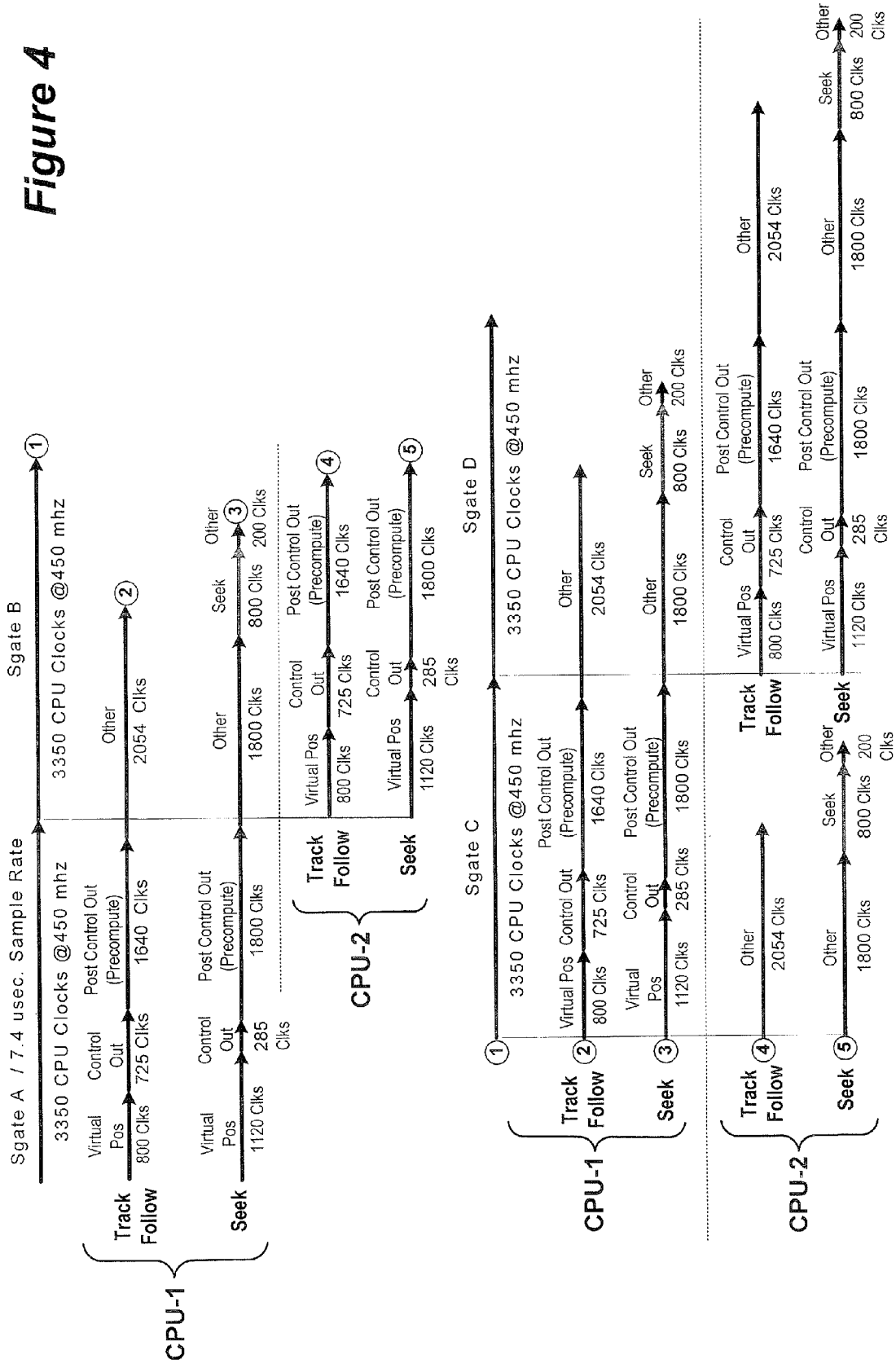
FIG. 4 is a data flow diagram that illustrates a time line of exemplary operations that may be carried out by the servo processors of FIG. 3 to alternately control head positioning responsive to servo patterns in a repeating sequential order in accordance with various embodiments.

FIG. 4 is a data flow diagram that illustrates a time line of exemplary operations that may be carried out by Servo Processor A 302 and Servo Processor B 304 of FIG. 3 to alternately control head positioning responsive to servo patterns in a repeating sequential A, B, C, D order (i.e., A, B, C, D, A, B, C, D, etc. . . . ) of servo sectors in accordance with various embodiments. For brevity, Servo Processor A 302 and Servo Processor B 304 are respectively referred to as "CPU-1" and "CPU-2" in FIG. 4. Referring to FIG. 4, when the head 20 reaches servo sector A, a Sgate A interrupt is generated that causes CPU-1 to take over control of head positioning. Similarly, when the head 20 reaches servo sector B a Sgate B interrupt is generated that causes CPU-2 to take over control of head positioning from CPU-1, when the head 20 reaches servo sector C a Sgate C interrupt is generated that causes CPU-1 to take over control of head positioning from CPU-2, and when the head 20 reaches servo sector D a Sgate D interrupt is generated that causes CPU-2 to take over control of head positioning from CPU-1. CPU-1 and CPU-2 can continue to take turns controlling head positioning in this manner as the repetitively occurring pattern of A, B, C, D servo sectors repeats during revolution of the disk 12.

During a track following operation, CPU-1 responds to Sgate A by reading actual head position data from the shared memory 310, which is generated from the PES as the head 20 is presently reading servo sector A. CPU-1 converts ("Virtual Pos" operation) the actual head position relative to the servo patterns into a virtual position for one or more data tracks so as to, for example, provide a desired track pitch that may vary as a function of radial position across the disk 12. CPU-1 may determine the virtual position in response to both the present actual head position and in further response to a previous virtual/actual position that was previously generated by CPU-2 for the previously read servo sector D. CPU-1 can read the previous virtual position from shared memory 310, where it was stored by CPU-2, and can write the present virtual position into the shared memory 310 for use by CPU-2 when determining the virtual position of the head relative to the next occurring servo sector B.

CPU-1 then outputs an actuator motor command ("Control Out" operation) responsive to the present virtual position that finely controls the actuator motor 28 to move the head 20 toward a centerline of a designated track. CPU-1 continues to algorithmically process the servo data from servo sector A to generate further servo control parameters ("Post Control Out (Precompute)" operation).

During the Post Control Out (Precompute) operation, CPU-1 may filter the servo data from servo sector A using a filter algorithm that is based on the following equation:

$$Y(n) = B_0 X(n) + B_1 X(n-1) + B_2 X(n-2) - A_1 Y(n-1) - A_2 Y(n-2) \ldots,$$

where Bn represents defined constants, X(n) represents a present virtual head position, X(n−1) represents the previous virtual head position from one servo sector before the present servo sector, X(n−2) represents the previous virtual head position from two servo sectors before, An represents defined constants, Y(n) represents the present filter output, Y(n−1) represents the previous filter output from one servo sector before, and Y(n−2) represents the previous filter output from two servo sectors before. CPU-1 can compute the present virtual head position $B_0 X(n)$ from the servo data being presently read from servo sector A, however it needs to obtain at least the previous virtual head position for the previous servo sector D from CPU-2 (i.e., $B_1 X(n-1)$) and needs to obtain the previous two filter outputs for the two previous servo sectors C and D (i.e., $A_1 Y(n-1)$ determined by CPU-2 and $A_2 Y(n-2)$ determined by CPU-1). CPU-1 obtains some of these values from CPU-2 via the shared memory 310, where the values were earlier written by CPU-2 after computation thereby. CPU-1 stores the computed present virtual head position X(n) and computed present filter output Y(n) in the shared memory 310 for later use by CPU-2 when computing the filter output for the next servo sector B (i.e., Y(n) for servo sector B).

Figure 5:
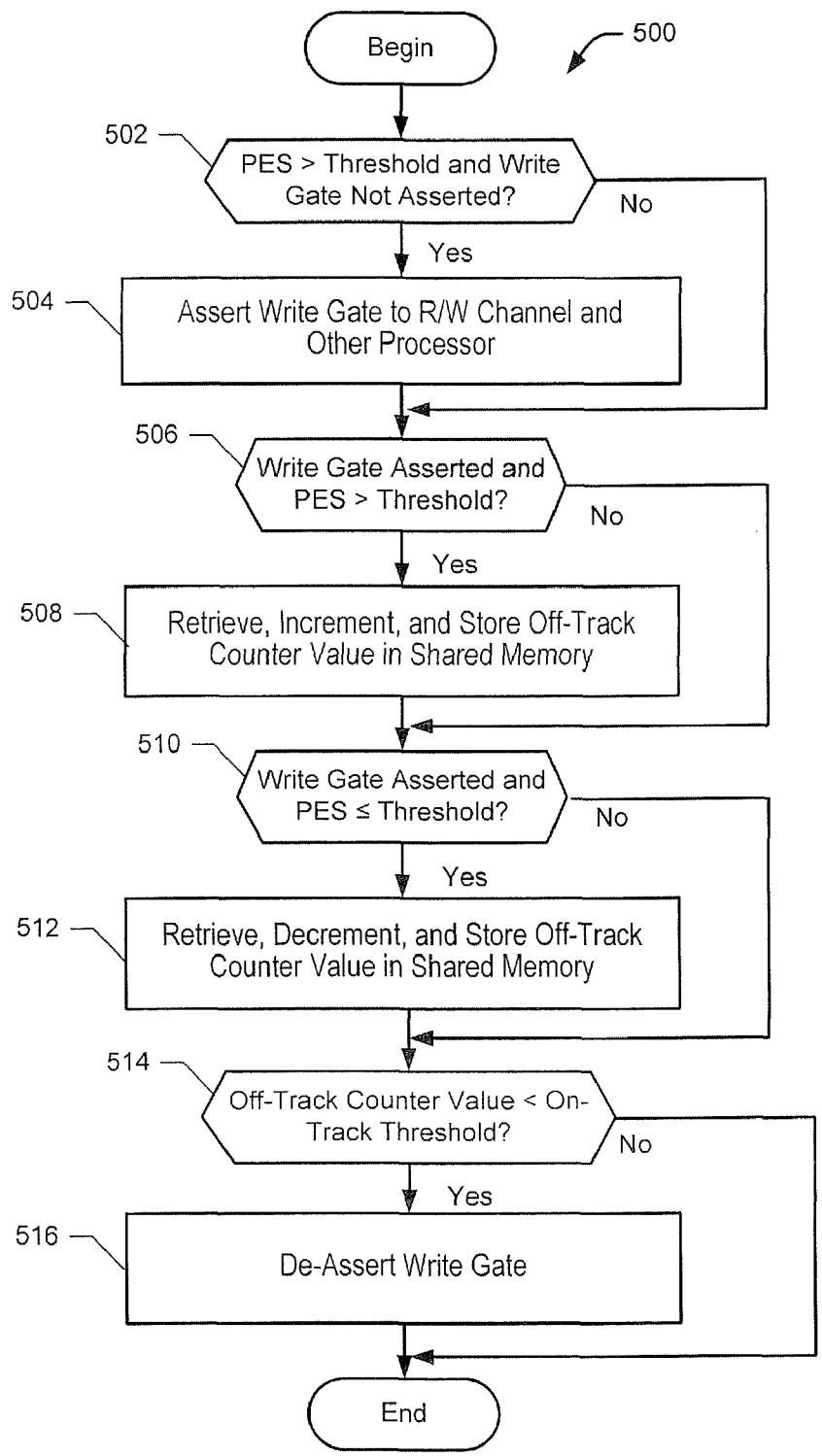
FIG. 5 is a flowchart of operations that may be carried out by the servo processors of FIG. 3 to detect that the head has become off-track and to assert a write gate to avoid off-track writing.

CPU-1 and CPU-2 can operate to detect when the head 20 has become off-track and respond thereto by asserting a write gate signal that is communicated to the read write channel 54 to inhibit writing through the head 20 until the head 20 has returned to being on-track and has stayed on-track for a defined number of servo sectors. FIG. 5 is a flowchart of operations 500 that can be carried out by CPU-1 and CPU-2 to avoid off-track writing.

Referring to FIGS. 4 and 5, during the Post Control Out (Precompute) operation, CPU-1 carries out the operations 500 to detect whether the head is off-track and to control the write gate signal. CPU-1 determines (block 502) whether PES exceeds a defined threshold and whether write gate is not yet asserted, and if so CPU-1 asserts (block 504) the write gate signal which is communicated to the read write channel 54 and CPU-2. CPU-1 then determines (block 506) whether write gate is asserted and PES exceeds the defined threshold and, if so, it retrieves an off-track counter value from the shared memory 310, increments the off-track counter value, and stores the off-track counter value back in the shared memory 310 (block 508). CPU-1 then determines (block 510) whether write gate is asserted and PES is less than or equal to the defined threshold and, if so, it retrieves the off-track counter value from the shared memory 310, decrements the off-track counter value, and stores the off-track counter value back in the shared memory 310 (block 512). CPU-1 then determines (block 514) whether the off-track counter value is less than a defined on-track threshold and, if so, it de-asserts the write gate. The de-asserted write gate is communicated to the read write channel 54 to enable writing through the head 20 onto the disk 12 and is communicated to CPU-2 for its use when carrying out the operations 500 on servo sectors B and D. The on-track threshold value may be zero, so that the write gate is de-asserted after the head 20 has remained on-track for the same number of servo sectors that it was off-track.

Figure 6:
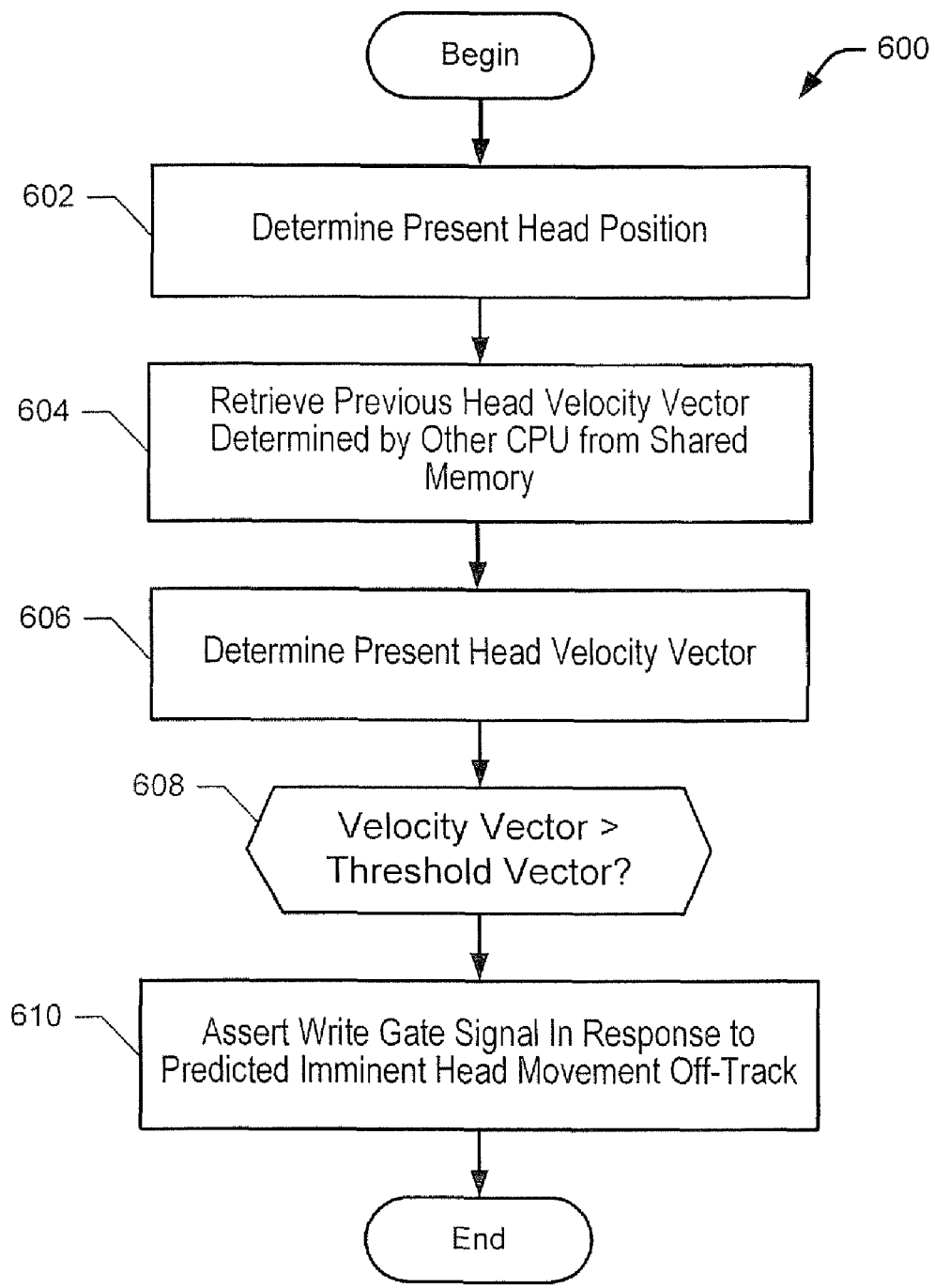
FIG. 6 is a flowchart of operations that may be carried out by the servo processors of FIG. 3 to predict that the head is about to become off-track and to assert a write gate to avoid off-track writing.

CPU-1 and CPU-2 can operate to predict when the head 20 is about to move off-track based on a determined velocity vector for the head 20 and can respond thereto by asserting the write gate to inhibit writing before the head 20 moves off-track. FIG. 6 is a flowchart of operations 600 that can be carried out by CPU-1 and CPU-2 to avoid off-track writing.

Referring to FIGS. 4 and 6, during the Post Control Out (Precompute) operation, CPU-1 determines (block 602) a present position of the head 20 and retrieves (block 604) from the shared memory 310 a previous head velocity vector (e.g., magnitude and radial direction) that was determined by CPU-2 for the previous servo sector (i.e., servo sector D). CPU-1 then determines (block 606) a present head velocity vector (e.g., magnitude and radial direction) in response to the present position of the head 20 and the previous head velocity vector from CPU-2 processing the previous servo sector. CPU-1 determines (block 608) whether the present head velocity vector exceeds a threshold vector which thereby indicates that the head is about to move off-track and, if so, it asserts (block 610) the write gate signal which is communicated to the read/write channel 54 to inhibit writing through the head 20 and which is communicated to CPU-2 for use in carrying out at least some of operations 500 of FIG. 5 to determine how long thereafter the head 20 has remained on track and when the write gate shall be de-asserted.

CPU-1 and CPU-2 can operate to counteract the effect of external disturbances (e.g., external excitation forces on the disk drive) on head positioning by responding to a vibration signal from a vibration sensor 340 (FIG. 3) to actively dampen head vibration. The vibration sensor 340 may be mounted to a printed circuit board that interconnects some of the electronic circuits 30 and/or mounted to a housing of the disk drive to sense and characterize characteristics of the excitation force before the head 20 substantially reacts thereto. CPU-1 and CPU-2 may each take turns generating a feedforward signal that controls the actuator motor 28 to actively dampen head vibration in response to a present magnitude and phase components of the vibration signal from the vibration sensor 340 and in response to previous magnitude and phase values that were earlier generated during a previous servo sector by the other one of CPU-1 and CPU-2.

For example, CPU-1 may filter the present magnitude and phase component values in response to the previous magnitude and phase values, and use the filtered result to generate the feedforward signal to the actuator motor 28. Accordingly, during the Post Control Out (Precompute) operation, CPU-1 determines a magnitude and phase of the vibration signal, retrieves a previous magnitude and phase of the vibration signal that was generated by CPU-2 during the previous servo sector (i.e. servo sector D), and generates therefrom the feedforward signal that is supplied to the actuator motor 28 to actively dampen head vibration by attempting to cause equal and opposite forces on the head 20 generated by the actuator motor 28 and generated by the external excitation so that the net force on the head 20 is about zero.

Some or all of the Post Control Out (Precompute) operations described above may not be completed by CPU-1 before the head 20 reaches the next servo sector B and another interrupt Sgate B is generated. Sgate B causes a handoff of responsibility for controlling head positioning from CPU-1 to CPU-2. However, CPU-1 continues to process the servo data from servo sector A to perform the non-completed or continuing Post Control Out (Precompute) operations and to carry out additional "Other" operations after Sgate B that are configured to cause the head 20 to track a centerline of a desired track while data is read from or written to blocks along the disk surface.

CPU-2 processes the servo data that is generated by the head 20 reading servo sector B using the Virtual Pos operation, Control Out operation, Post Control Out (Precompute) operation, and Other operations are described above as being carried out by CPU-1 to process servo data from servo sector A to perform a track following-operation. Thus, CPU-2 can determine the present virtual head position in response to the present servo data and in response to the previous actual head position and/or virtual head position determined by CPU-1 for the servo sector A. CPU-2 can filter the servo data from servo sector B using the filter algorithm described above which retrieves and uses from the shared memory 310 the values of the previous virtual head position for previous servo sector A (i.e., $B_1 X(n-1)$ determined by CPU-1) and the previous two filter outputs for the two previous servo sectors A and D (i.e., $A_1 Y(n-1)$ from CPU-1 and $A_2 Y(n-2)$ from CPU-2). CPU-2 can carry out the operations 500 of FIG. 5 to detect whether the head is off-track and to control the write gate signal using the shared write gate signal and off-track counter value that can be stored in the shared memory 310 by CPU-1 from its processing of servo sector A. CPU-2 can further carry out the operations 600 of FIG. 6 to predict whether the head is about to move off-track and to control the write gate signal using the velocity vector values that were generated and stored in the shared memory 310 by CPU-1 from its processing of servo sector A.

In a similar manner, some or all of the Post Control Out (Precompute) operations may not be completed by CPU-2 before the head 20 reaches the next servo sector C and another interrupt Sgate C is generated. Sgate C causes a handoff of responsibility for controlling head positioning from CPU-2 to CPU-1. However, CPU-2 continues to process the servo data from servo sector B to perform the non-completed or continuing Post Control Out (Precompute) operations and to carry out additional "Other" operations after Sgate C. CPU-1 processes the servo data that is generated by the head 20 reading servo sector C using the Virtual Pos operation, Control Out operation, Post Control Out (Precompute) operation, and Other operations are described above as being carried out by CPU-1 to process servo data from servo sector A to perform a track following-operation.

In a similar manner, some or all of the Post Control Out (Precompute) operations may not be completed by CPU-1 before the head 20 reaches the next servo sector D and another interrupt Sgate D is generated. Sgate D causes a handoff of responsibility for controlling head positioning from CPU-1 to CPU-2. However, CPU-1 continues to process the servo data from servo sector C to perform the non-completed or continuing Post Control Out (Precompute) operations and to carry out additional "Other" operations after Sgate D. CPU-2 processes the servo data that is generated by the head 20 reading servo sector D using the Virtual Pos operation, Control Out operation, Post Control Out (Precompute) operation, and Other operations are described above as being carried out by CPU-1 to process servo data from servo sector A to perform a track following-operation.

CPU-1 and CPU-2 can thereby alternately take turns controlling head positioning to perform a track following-operation in response to servo patterns that are read from alternately occurring servo sectors. With continued reference to FIG. 4, CPU-1 and CPU-2 can operate to take turns controlling movement of the head 20 across the disk 12 while seeking the head 20 to a target track during a seek operation.

CPU-1 responds to Sgate A by processing the servo data that is generated by the head 20 reading servo sector A using the Virtual Pos operation, Control Out operation, Post Control Out (Precompute) operation, and Other operations that were described above as being carried out by CPU-1 during a first phase that determines the present actual and virtual head positions, filters the servo data from servo sector A using the filter algorithm described above, carries out the operations 500 of FIG. 5 to detect whether the head is off-track and to control the write gate signal, and carries out the operations 600 of FIG. 6 to predict whether the head is about to move off-track and to control the write gate signal responsive thereto. As described above, some or all of the Post Control Out (Precompute) operations may not be completed by CPU-1 before the head 20 reaches the next servo sector B and another interrupt Sgate B is generated. The Post Control Out (Precompute) operations can continue after Sgate B and further seek operations ("Seek") can be carried out to move the head across the disk 12 according to a defined velocity trajectory toward a defined target track.

CPU-2 responds to Sgate B by processing the servo data that is generated by the head 20 reading servo sector B using the Virtual Pos operation, Control Out operation, Post Control Out (Precompute) operation, Other, and Seek operations that were described above as being carried out by CPU-1 to determine the present actual and virtual head positions, filters the servo data from servo sector A using the filter algorithm described above, to carry out the operations 500 of FIG. 5 to detect whether the head is off-track and to control the write gate signal, and to carry out the operations 600 of FIG. 6 to predict whether the head is about to move off-track and to control the write gate signal responsive thereto. As described above, some or all of the Post Control Out (Precompute) operations may not be completed by CPU-2 before the head 20 reaches the next servo sector C and another interrupt Sgate C is generated. The Post Control Out (Precompute) operations can continue after Sgate C and further seek operations ("Seek") can be carried out to continue to move the head across the disk 12 according to a defined velocity trajectory toward the defined target track.

CPU-1 responds to Sgate C by taking over control of the continued seeking of the head 20 toward the target track until the head reaches the next servo sector D, which triggers generation of another interrupt Sgate D. CPU-2 responds to Sgate D by taking over control of the continued seeking of the head 20 toward the target track until the head reaches the next servo sector A, which triggers generation of another interrupt Sgate A and resulting handoff of seek control back to CPU-1.

Although various embodiments have been described in the context of the A and B servo processors 302 and 304 alternately and exclusively control head positioning during the entire even/odd occurring servo sectors 60, the invention is not limited thereto. In some other embodiments, the A and B servo processors 302 and 304 can alternately operate to exclusively control head positioning during different portions of the same servo sector 60.

Figure 7:
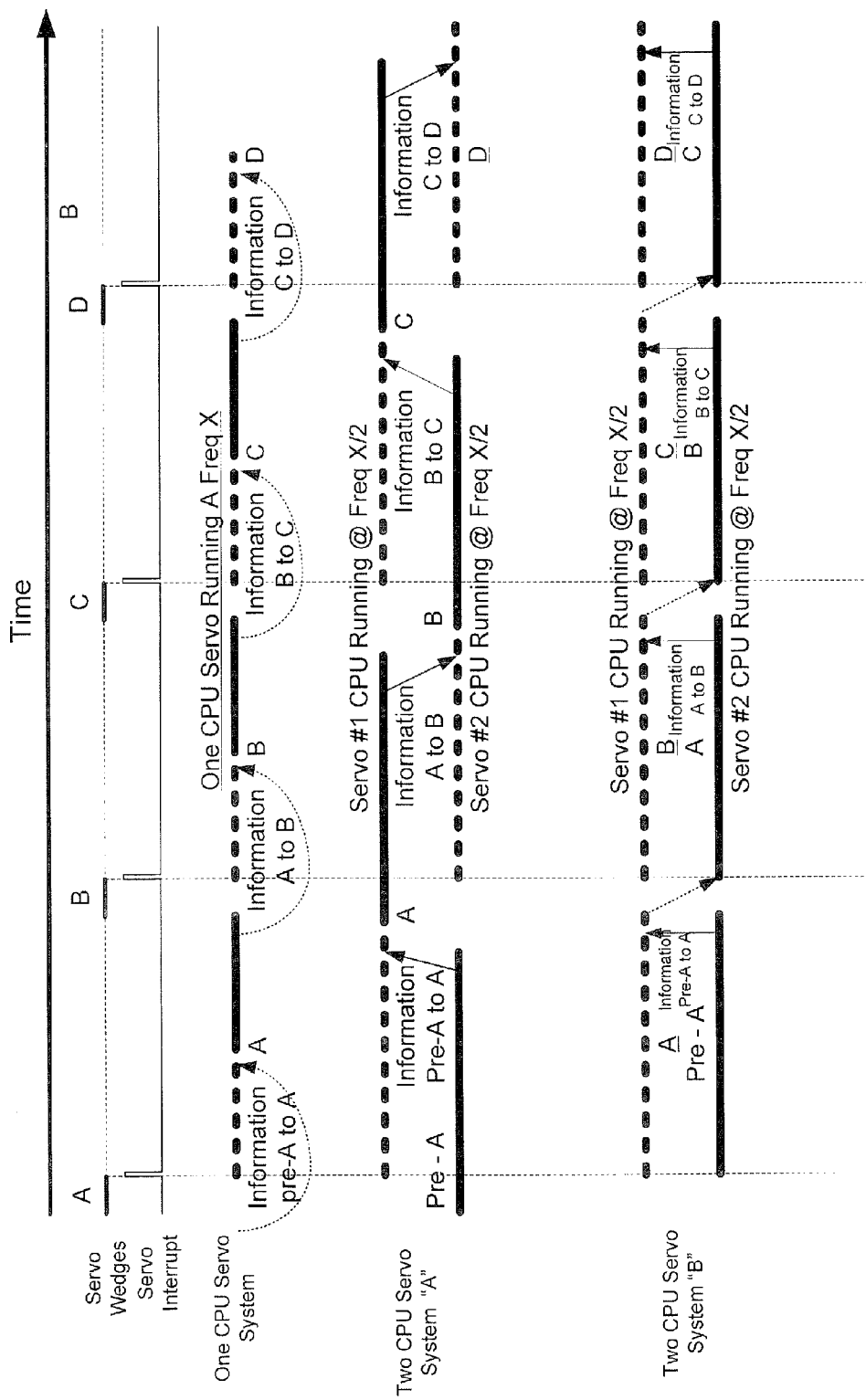
FIG. 7 is another data flow diagram that illustrates a time line of exemplary operations that may be carried out by the processors of FIG. 3 to alternately control head positioning responsive to different portions of a same servo sector in accordance with various embodiments.

FIG. 7 is another data flow diagram that illustrates a time line of exemplary operations that may be carried out by the processors of FIG. 3 to alternately control head positioning responsive during different portions of the same servo sector 60 in accordance with various embodiments. Referring to FIG. 7, a conventional single servo processor ("One CPU Servo System") operating at a defined clock frequency X attempts to control head positioning during each of the illustrated A, B, C, and D servo sectors. The single servo processor uses servo parameters determined from a previous servo sector in the processing of a present servo sector (e.g., "information pre-A to A", "information pre-B to B", "information pre-C to C", and "information pre-D to D").

In sharp contrast, in accordance with some embodiments, CPU-1 processes a servo sector to processes the servo data therein and control head position for about half of a servo sector, and it then relays certain of its computed servo parameter information to CPU-2 which continues to processes the servo data therein and control head position for the remaining half of the same servo sector. CPU-1 and CPU-2 may, for example, operate at half of the clock frequency X of the conventional single servo processor.

In FIG. 7, processing that occurs for a first half of a servo sector is illustrated as a dashed line and processing that occurs for a second half of a servo sector is illustrated as a solid line. Thus, as shown in FIG. 7, CPU-1 receives information that was calculated before servo sector A ("information pre-A to A") which it uses to compute servo parameter information and control head position for about half of servo sector A, and then passes certain of its computed servo parameter information to CPU-2 which continues to processes servo sector A and control head position for the remaining half of the same servo sector.

CPU-1 receives information that was calculated before servo sector B ("information pre-B to B") which it uses to compute servo parameter information and control head position for about half of servo sector B, and then passes certain of its computed servo parameter information to CPU-2 which continues to processes servo sector B and control head position for the remaining half of the same servo sector. The relay of information and responsibility for controlling head positioning for different portions of the same servo sector is repeated for servo sectors C, D, and other servo sectors and the disk 12 rotates.

In this manner, a plurality of servo processors takes turns controlling the positioning of a head by an actuator motor during track following and during seeking to a defined target track in response to different defined ones of sequentially occurring servo signals from a plurality of spaced apart servo sectors on a rotating disk, and/or in response to different portions of the same servo sector.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit comprising:
a plurality of servo processors configured to execute operation code to control positioning of a head by an actuator in response to servo data from a plurality of spaced apart servo patterns on a media, wherein the plurality of servo processors comprise a first servo processor configured to output a first actuator motor command to control head movement and a second servo processor configured to output a second actuator motor command to control the head movement; and
a controller configured to alternate control between the first and second servo processors so that the first servo processor outputs the first actuator motor command responsive to the head reading a first servo pattern and the second servo processor outputs the second actuator motor command responsive to the head reading a second servo pattern spaced from the first servo pattern.

2. The circuit of claim 1 wherein the first servo processor is configured to process servo data from the first servo pattern and the second servo processor is configured to process servo data from the second servo pattern wherein the second servo processor generates present servo control data generates the second actuator motor command using the servo data from the second servo pattern and using the servo data processed by the first servo processor from the first servo pattern.

3. The circuit of claim 1, wherein the controller is configured to generate interrupt signals to alternate control between the first and second servo processors and
the first servo processor is configured to respond to interrupt signals generated from the head reading odd ones of the servo patterns by positioning the head responsive to servo bursts from the odd servo patterns; and
the second servo processor is configured to respond to interrupt signals generated from the head reading even ones of the servo patterns by positioning the head responsive to servo bursts from the even servo patterns.

4. The circuit of claim 1, wherein:
the first and second servo processors are configured to detect when the head has become off-track and assert a write gate signal wherein the write gate signal asserted by one of the first or second servo processors is communicated to the other of the first and second servo processors.

5. The circuit of claim 4, wherein:
the first and second servo processors are configured to increment a common off-track counter value when the head is off-track and decrement the off-track counter value when the head is on-track, and the first and second servo processors are configured to determine if the common off-track counter value is less than a threshold value and de-asserting the write gate signal.

6. The circuit of claim 1, wherein:
the first servo processor is configured to generate present filter coefficient values using the servo data from the first servo pattern and the second servo processor is configured to generate the present filter coefficient values using the servo data from the second servo pattern and the present filter coefficient values generated by the first servo processor and filter the servo data using the present filter coefficient values.

7. The circuit of claim 1, wherein:
the first and second servo processors are configured to determine a present velocity vector, which indicates a magnitude and direction of head velocity, wherein one of the first or second servo processors determines the present velocity vector in response to a present head position determined by one of the first and second servo patterns read by the head and in response to a previous velocity vector that was generated by the other of the first or second servo processors.

8. The circuit of claim 7, wherein:
the first and second servo processors are configured to determine whether the head is about to move off-track in response to the magnitude and direction indicated by the present velocity vector and assert a write gate signal if the head is about to move off-track.

9. The circuit of claim 1, wherein:
the first and second servo processors are configured to determine present magnitude and phase values for a present component of a vibration signal from a vibration sensor, and control the actuator to actively dampen head vibration using the present magnitude and phase values of the present component of the vibration signal determined by one of the first or second servo processors and using previous magnitude and phase values that were generated for a previous component of the vibration signal by the other of the first or second servo processors.

10. The circuit of claim 1 wherein the operation code is stored in a shared memory accessible to the first and second servo processors and the first and second servo processors are configured to utilize the operation code in the shared memory to process the servo data from the first and second servo patterns.

11. The circuit of claim 1 wherein the controller continues to alternate control between the first and second servo processors and output the first and second actuator motor commands in response to the head reading sequential first and second servo patterns from the media.

12. The circuit of claim 1 wherein one of the first or second servo processors is configured to determine a virtual head position value using a present actual head position value from the servo data from one of the first or second servo patterns and a previous head position value that was determined from the other of the first or second servo processors using the servo data from the other of the first or second servo patterns.

13. A method comprising:
processing servo data from a first servo pattern read from a media using a first servo processor;
providing an interrupt signal in response to a second servo pattern read from the media; and
processing servo data from the second servo pattern read from the media using a second servo processor in response to the interrupt signal.

14. The method of claim 13, further comprising:
operating the first servo processor responsive to interrupt signals generated from a head reading odd ones of the servo patterns from the media to position the head responsive to servo bursts from the odd servo patterns; and
operating the second servo processor responsive to interrupt signals generated from the head reading even ones of the servo patterns from the media to position the head responsive to the servo bursts from the even servo patterns.

15. The method of claim 13, further comprising:
operating the second servo processor to control movement of a head using the servo data from the second servo pattern and using the servo data processed by the first servo processor from the first servo pattern;
storing the servo data processed by the second servo processor from the second servo pattern in a shared memory.

16. The method of claim 13 comprising:
continuing to process the servo data from the first servo pattern using the first servo processor after the interrupt signal in response to the second servo pattern read from the media.

17. The method of claim 13 wherein the step of processing the servo data from the second servo pattern using the second servo processor in response to the interrupt signal comprises:
retrieving previous head position data generated by the first servo processor from a shared memory; and
generating present head position data using the servo data from the second servo pattern and the previous head position data from the shared memory generated by the first servo processor.

18. The method of claim 13 and comprising:
outputting a first actuator control command generated by the first servo processor to control movement of a head using the servo data from the first servo pattern; and
outputting a second actuator control command generated by the second servo processor using the servo data from the second servo pattern.

19. The method of claim 18 and comprising:
providing an additional interrupt signal in response to an additional servo pattern read from the media; and
processing servo data for the additional servo pattern and outputting an additional actuator control command generated by the first servo processor using the servo data from the additional servo pattern in response to the additional interrupt signal.

20. A servo circuit comprising:
a memory circuit; and
a plurality of servo processors configured to take turns controlling an actuator to position a head across a data storage disk in response to sequentially occurring servo signals from a plurality of spaced apart servo patterns on the disk, wherein the memory circuit is configured as a shared memory that is accessed by each of the plurality of servo processors to share information therebetween via defined shared memory locations in the memory circuit, such that the information stored by one servo processor in a shared memory location may be retrieved by another servo processor.

* * * * *